United States Patent Office 2,962,879
Patented Dec. 6, 1960

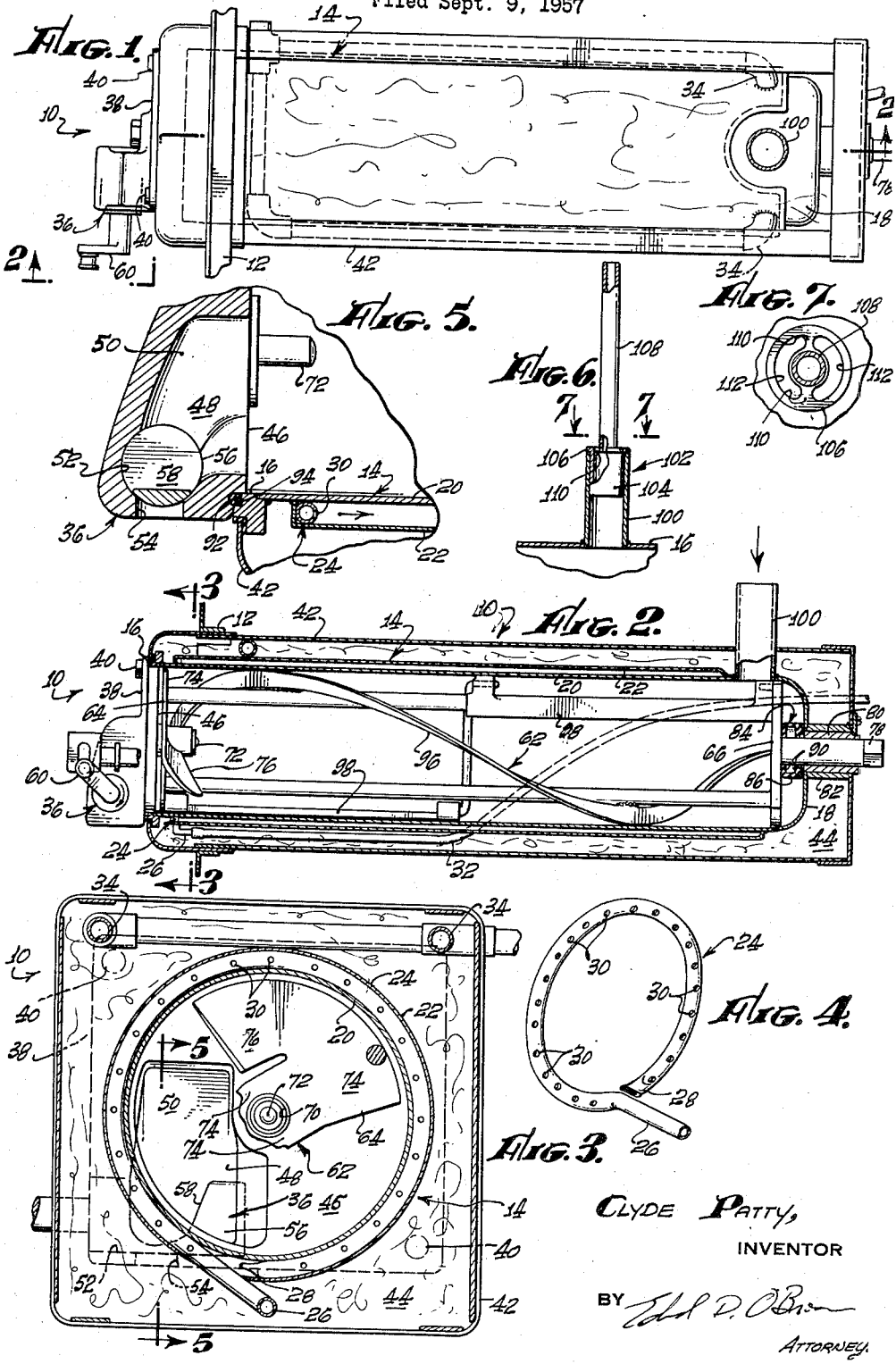

2,962,879

FREEZING CYLINDERS

Clyde Patty, 4562 St. Charles Place, Los Angeles 19, Calif.

Filed Sept. 9, 1957, Ser. No. 682,977

1 Claim. (Cl. 62—342)

This invention relates to a new and improved freezing cylinder and to the discharge means employed with the same. More specifically, however, it relates to freezing cylinders of the type used in preparing milk shakes, soft ice cream, etc.

This application is a continuation-in-part of the co-pending application Serial No. 444,774, filed July 21, 1954, entitled, "Dispensing Frozen Ice Cream and Milk Shake Products," now abandoned.

Machines for preparing and dispensing soft ice cream, milk shakes and the like are widely employed throughout the United States at the present time. Virtually every individual is familiar with machines of this general type, but many of the problems with respect to these machines are not known to others than those who manufacture and use them. Many of the problems with respect to the machines for manufacturing ice cream and milk shakes arise from the types of constructions employed in the freezing cylinders in such machines.

A freezing cylinder in a machine of the type referred to above must, for satisfactory performance purposes, be formed so as to uniformly agitate and freeze a liquid or semi-liquid preparation. Further, it must be formed in such a manner as to include dispensing valve means and means which serve to push the ice cream from the freezing cylinder as ice cream or the like is being dispensed. For practical reasons, it is necessary that the means for dispensing ice cream be located with respect to the freezing cylinder so that the temperature within such means is effectively maintained in such a manner as to avoid either partial or complete melting of material within or adjacent to such means. Further, for sanitary reasons, it is necessary to manufacture a freezing cylinder of the type described in such a manner that this freezing cylinder may be conveniently dis-assembled and cleaned.

An object of the present invention is to provide freezing cylinders for machines used in freezing and dispensing soft ice cream, milk shakes and the like which cylinders constitute an improvement over prior apparatus of a related category. A more specific object of the present invention is to provide in freezing cylinders of the type described a construction for dispensing a freezing or coolant gas in such a manner as to obtain the maximum effectiveness from such gas in a uniform manner. A related object of the invention is also to provide new and improved means for dispensing ice cream or the like from a freezing cylinder of the type to which this invention pertains. An object of this invention is also the construction of freezing cylinders which may be easily and conveniently cleaned, and which are comparatively inexpensive to manufacture.

Because of the nature of this invention, it is not considered necessary to set forth in this specification a further long list of various objects and advantages of it. Such other objects and advantages of the invention itself will be fully apparent to those skilled in the art to which this invention pertains from a careful consideration of the remainder of this specification, including the appended claim, and from a consideration of the accompanying drawing in which:

Fig. 1 is a top plan view of a freezing cylinder of the present invention;

Fig. 2 is a cross sectional view taken at line 2—2 of Fig. 1;

Fig. 3 is a cross-sectional view taken at line 3—3 of Fig. 2;

Fig. 4 is a perspective view of a part employed in the freezing cylinder shown in the preceding figures;

Fig. 5 is a cross-sectional view taken at line 5—5 of Fig. 3;

Fig. 6 is a side elevational view, partially in section; showing a valve structure which may be used in introducing certain liquid compositions into a freezing cylinder; and Fig. 7 is a cross-sectional view taken at line 7—7 of Fig. 6.

In all figures of the drawing like numerals are used to designate like parts wherever possible for purposes of convenience and explanation. It is to be understood that the accompanying drawing is primarily intended to clearly illustrate or show a presently preferred embodiment of this invention. Those skilled in the art to which this invention pertains will realize that number of differently appearing structures may be manufactured which utilize the essential features or principles employed in the construction shown.

As an aid to understanding this invention, it may be stated in essentially summary form that it concerns freezing cylinders each of which is built so as to include a double walled cylinder having ends, one of these ends being open. Around the cylinder insulating material is preferably located in an established manner. Between the walls of the cylinder adjacent to the open end of it a gas distributing pipe is located. In accordance with this invention this pipe is formed so as to extend completely around the inner wall of this cylinder and so as to include openings which are adapted to distribute a freezing gas completely around the inner wall of the cylinder between the double walls employed. Further, at the other end of the cylinder are provided separate means for removing "spent" or warm gas from between the walls of the cylinder. Also with this invention a dispensing valve is mounted upon a plate which is secured to the open end of the freezing cylinder in such a manner that the valve is located tangentially to the cylinder itself as will hereinafter be described. Further, with the invention dasher means are rotatably mounted within the cylinder so as to be in engagement with the inside thereof.

In order to explain this invention more fully it is considered necessary to refer directly to the accompanying drawing where there is shown a complete freezing cylinder assembly 10 of the present invention mounted upon a wall 12 of a machine for freezing and dispensing soft ice cream, milk shakes or the like. Obviously this assembly 10 can be secured to additional framework besides the wall 12. The assembly 10 is built around a double walled cylinder 14 having an open end 16 and a closed end 18. Around the outside of the inner wall 20 of this cylinder there is located an outer wall 22 which in effect defines a jacket extending the entire length of the cylinder 14 from immediately adjacent to the open end 16 to immediately adjacent to the closed end 18.

Between the walls 20 and 22 immediately adjacent to the end 16 there is located a tube 24 (Figs. 3 and 4) which extends completely around the inner wall 20. An end 26 of the tube 24 extends through the outer wall 22 and is preferably sealed with respect to this wall. The other end 28 of the tube 24 is closed. With this construction, a coolant such as, for example difluor dichloromethane or the like, may be conveyed through a series of equally spaced openings 30 in the tube 24 into the space between the walls 20 and 22. Such coolant is conveniently supplied to the tube 24 by means of another tube 32 which is attached to the end 26 as shown.

The openings 30 are designed and located so as to, in effect, serve as nozzles which direct coolant in a series of separate paths parallel to the axis of the cylinder 14. Obviously this coolant within the space between the walls 20 and 22 will intermix to some extent so that it may be conveniently removed from the space between the walls 20 and 22 after having been "spent" by means of pick-up pipes 34 extending into this space between these walls 20 and 22.

The spacing of the pipes 34 is not considered critical with this present invention; however, the disposition and use of the tube 24 adjacent to the open end 16 of the cylinder 14 is considered important in obtaining effective results, since an ice cream or milk shake preparation is dispensed from the cylinder 14 through a barrel type of valve 36 located upon an end closure plate 38 secured over the open end 16 of the cylinder 14. Bolts 40 may conveniently be used for the purpose of securing this plate 38 in place. Preferably these bolts engage with a housing 42 located around the cylinder 14 so as to hold insulating material 44 around this cylinder 14.

The plate 38 possesses a generally flat surface 46 located just within the end 16 of the cylinder 14 and is built so as to include a cavity 48 having sloping walls 50 leading to a cylindrical bore 52 extending across the bottom of the cavity 48. An appropriate dispensing opening 54 leads from this bore 52 to the outside of the closure plate 38. Within the bore 52 there is mounted a cylindrical valve body 56 having an enlarged groove 58 formed therein. This valve body is adapted to be rotated by means of a small handle 60.

It is noted that the cavity 48 is located at one side of the center of the surface 46 of the plate 38 and that the walls 50 are formed so as to generally taper toward the bore 52. The purpose of this construction is to locate the valve body 56 in an offset or tangential manner with respect to the axis of the cylinder 14 so that an ice cream or milk shake preparation may be effectively pushed toward this groove during the operation of the assembly 10.

The pushing action referred to above is accomplished with the assembly 10 by means of a dasher 62 having ends 64 and 66 connected by rods 68. The end 64 is formed so as to include a bearing-like opening 70 which is adapted to receive a projecting pin or shaft 72 extending from the center of the surface 46 of the plate 38 in order to rotatably support this end of the dasher 62. This end 64 is also provided with a plate-like surface 74 located immediately adjacent to the surface 46 of the plate 38 and the surface 74 is provided with extending flange-like pusher members 76 which are adapted to gather ice cream or the like from within the cylinder 14 so as to force this ice cream into the cavity 48 and out through the groove 58 in the valve body 46 when this valve body is rotated to an open position.

Rotation of the dasher 62 is accomplished through the use of an appropriate motor (not shown) of a conventional type which is attached to a shaft 78 extending through a bearing 80 mounted so as to extend from the closed end 18 out through the housing 42 as shown. This bearing 80 is supported within a sleeve 82 attached to the closed end 18 of the cylinder 14 and attached to the housing 42. Thus, the bearing 80 may be conveniently removed from the entire assembly for cleaning purposes. A seal is maintained adjacent to the bearing 80 by means of a rubber ring 84 having a side wall 86 spaced from the shaft 78 and resilient flexible end walls 90 engaging the end 66 of the dasher 62 and engaging the end 18 of the cylinder 14. The ring 84 is normally held under compression by pressure applied to it through the dasher 62 when the plate 38 is held in place. The plate 38 may be conveniently sealed with respect to the cylinder 14 by means of a small O-ring 92 located in a groove 94 formed at the open end 16 of the cylinder 14.

The dasher 62 itself is formed so as to include a real-like blade 96 extending from the end 64 to the end 66 in contact with the interior of the cylinder 14. It also includes rotatably mounted blades 98 which extend parallel to the axis of the cylinder 14 in contact with the interior of this cylinder. The purposes and functioning of these blades 96 and 98 will be apparent to those skilled in the art. During the use of the cylinder 14 a liquid or semi-liquid composition (not shown) is introduced into the cylinder through a pipe 100 adjacent to the closed end 18 of the cylinder 14 and this liquid is distributed against the interior of the cylinder 14 by means of the blades 96 and 98 on the dasher 62 and is moved with respect to the cylinder and pushed toward the open end 16 of the cylinder 14 as the dasher 62 is rotated. It is noted that the blade 96 is curved so as to accomplish this purpose.

A number of different mechanisms may be used to introduce a liquid or semi-liquid preparation into the pipe 100. A suitable valve mechanism which is actuated in conjunctoin with the use of the entire cylinder assembly 10 is shown in the copending application referred to at the start of this specification. It is also possible with many types of liquid and semi-liquid preparations to use what may be termed a valve 102 illustrated in Figs. 6 and 7 of the drawing. This valve consists of a cylinder 104 which fits closely within the pipe 100 and a flange 106 which engages the top of this pipe. A small tube 108 is mounted upon arms 110 so as to extend upwardly from the pipe 100 to the top of an appropriate feed tank (not shown) so as to convey air into the pipe 100 as the valve 102 is used. The top of the pipe 100 is, in accordance with conventional practice, normally located so as to extend from the bottom of such a feed tank (not shown) and the openings 112 located between the flange 106 and the base of the tube 108 are used to convey a liquid preparation from such a tank into the cylinder 14.

Those skilled in the art to which this invention pertains will realize that the construction herein shown and described is very efficient for the purpose intended and that this construction is very simple to manufacture and to utilize. They will further realize that it may be readily cleaned and an effective freezing action is achieved within the cylinder 14 because of the means provided for distributing coolant employed, and that this coolant is employed in such a manner as to effectively maintain the temperature desired within the cavity 48 in the plate 38 so as to avoid melting or partial melting of a composition within this cavity. The uniform type of cooling action achieved with this invention differs from the cooling action of many prior constructions in that in these prior constructions there is normally a material temperature differential between the top and bottom of the freezing cylinder, and such a temperature differential precludes effective, trouble-free operation such as can be achieved with a freezing cylinder assembly as herein described.

Those skilled in the art to which this invention pertains will further realize that obviously a wide variety of differently appearing freezing cylinder assemblies may be manufactured so as to utilize the essential features or principles of this invention. For this reason this invention is to be considered as being limited only by the appended claim forming a part of this disclosure.

I claim:

A freezing cylinder assembly which includes: a double walled cylinder having ends, one of said ends being open; plate means mounted on said open end so as to seal said open end; cavity means formed in said plate at one side of the center of said cylinder so as to have sloping walls leading tangentially from said cylinder;

valve means mounted on said plate at the end of said cavity means, said valve means being capable of being opened so as to dispense material from within said cylinder; dasher means rotatably mounted within said cylinder, said dasher means including pusher means mounted adjacent to said plate, said pusher means being adapted to force material into said cavity and through said valve means when said dasher means is rotated, said dasher means also including blade means engaging the interior of said cylinder, said blade means being adapted to transport material within said cylinder toward the open end thereof; means for introducing material into the end of said cylinder remote from said open end; tube means extending between the walls of said cylinder completely around the inner wall of said cylinder adjacent to said open end, said tube means having a plurality of holes formed therein, said holes capable of being used so as to convey a coolant gas between the walls of said cylinder from adjacent to said open end to adjacent the other end of said cylinder; and means for removing coolant gas from between the walls of the other end of said cylinder.

References Cited in the file of this patent
UNITED STATES PATENTS

| | | |
|---|---|---|
| 1,623,535 | Ferguson | Apr. 5, 1927 |
| 1,992,581 | Reeder | Feb. 26, 1935 |
| 1,993,130 | Ballew | Mar. 5, 1935 |
| 2,030,233 | Thoma | Feb. 11, 1936 |
| 2,059,065 | Tuscan | Oct. 27, 1936 |
| 2,067,683 | Routh | Jan. 12, 1937 |
| 2,085,542 | Neitzel | June 29, 1937 |
| 2,261,531 | Thomas | Nov. 4, 1941 |
| 2,278,340 | Weinreich | Mar. 31, 1942 |
| 2,560,664 | Sammy | July 17, 1951 |
| 2,610,478 | Lofstedt | Sept. 16, 1952 |
| 2,820,477 | Dorsak et al. | Jan. 21, 1958 |